Patented Feb. 3, 1948

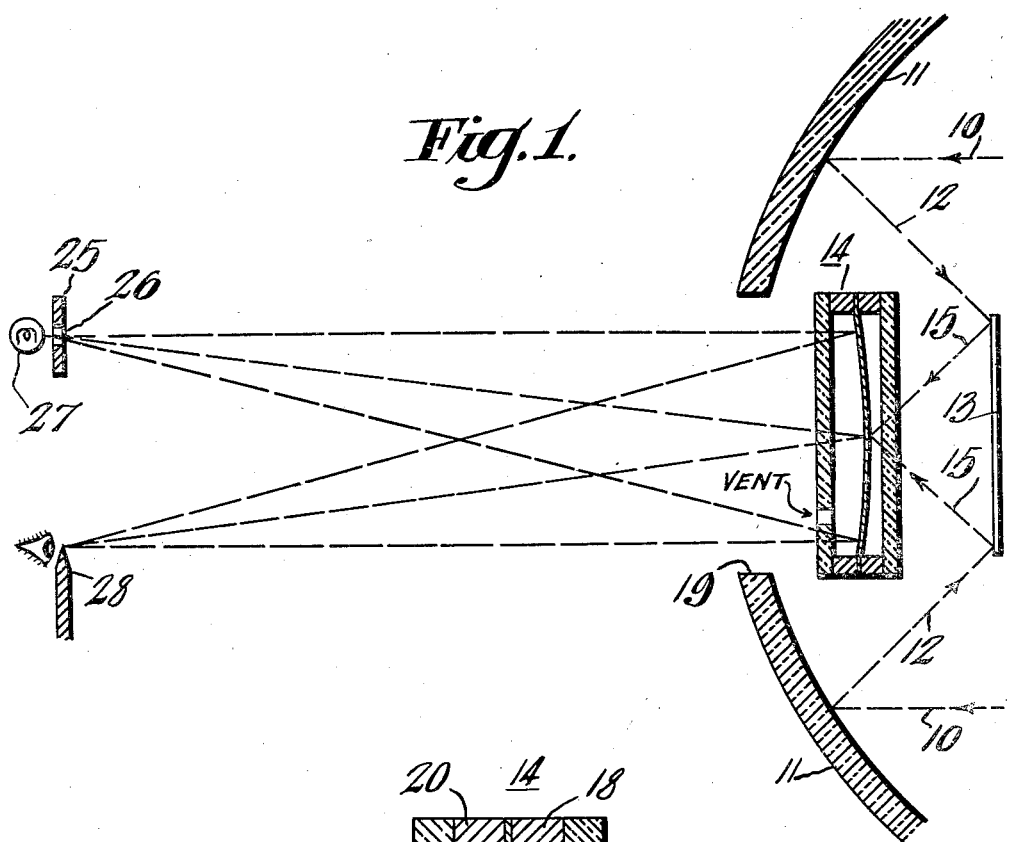
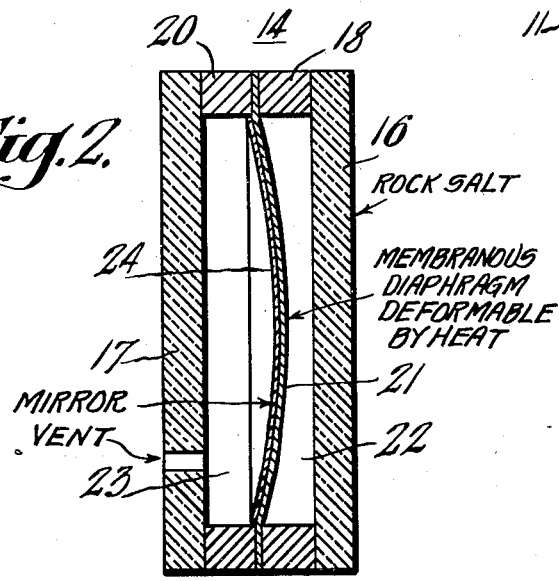

2,435,519

UNITED STATES PATENT OFFICE 2,435,519

IMAGE-FORMING HEAT DETECTOR

William A. Tolson, Princeton, N. J., assignor to Radio Corporation of America, a corporation of Delaware Application February 14, 1944, Serial No. 522,345

7 Claims. (Cl. 250—83)

The present invention relates to the detection of radiant energy, and more particularly to converting a heat image directly into an optical image.

An object of the invention is to provide a translating device for directly producing a visible image from a heat image.

Another object of the invention is to provide a novel optical system for producing a visible image from a heat image.

A further object of the invention is to provide an extremely sensitive heat-responsive unit as a means for varying the contour of a spherical mirror whereby very minute deviations from a true spherical surface can be optically observed as images of the heat images focussed upon the unit.

A still further object is to provide a membranous diaphragm deformable in response to heat waves and operating a mirror to reflect light changes in accordance with the deformations of the diaphragm which changes can be continuously viewed to thereby approximate an image of the incident heat waves.

Further objects will hereinafter appear.

In the accompanying drawings, Figure 1 represents diagrammatically one form of optical system embodying the present invention, the heat-responsive unit therein being shown in vertical section; and Figure 2 represents a sectional elevation of the heat-responsive unit on a larger scale and with the diaphragm greatly magnified.

Referring to the drawings, heat waves 10 emanating from an area under observation are received upon the concave side of a spherical mirror 11, and are reflected, as indicated by arrow lines 12, to the surface of a plane reflector 13, for focussing them upon a heat-responsive unit 14, as indicated by the arrow lines 15. As an alternative construction, this heat image may be produced directly by a lens constructed of rock salt. In the present instance, the unit 14 comprises a circular housing formed by a disc 16 of rock salt on one side, a disc 17 of optically flat glass on the other side, and two annular gaskets 18 and 20, spacing the two sides and hermetically sealing the housing. The heat-sensitive membranous diaphragm 21 is marginally clamped between the gaskets to divide the unit into two chambers 22 and 23, while the space between the sides is sufficient to permit unrestricted deflection of the diaphragm 21. The responsive unit 14 is located within the curvature of the mirror 11, and is arranged to be viewed through a sight opening 19 in the curved mirror 11. While the parts 16 and 17 are referred to as "discs," each is in effect a window and this latter is employed in the claims.

For forming the diaphragm 21 of microscopic thinness to carry out the sensitive action necessary, a material, such as cellulose acetate, having a very high coefficient of expansion, is preferably used, and incorporated into a solution which is made sufficiently plastic to prevent breakage and contains an ingredient to minimize the effects of humidity. Also, the solution is impregnated with a dye which renders the completed diaphragm practically opaque to heat radiation. The solution is used to form the diaphragm by a flotation process such as the following. One of the gaskets 18 or 20 is mounted horizontally at the bottom of a container and completely covered with distilled water. A few drops of the foregoing solution are deposited upon the surface of the water and which spreads entirely across the surface in the form of a film which is then allowed to dry sufficiently to resist movement. When thus dried, the water level is gradually and carefully lowered, so that the film seats upon the gasket and is then marginally clamped by the other gasket, the two gaskets thus forming a frame to support the film in diaphragm form. The film dries completely in the frame becoming very tight and exhibiting considerable elasticity when stretched or deformed. The assembled diaphragm is now coated on one side with an extremely thin layer of a highly reflecting substance, such as aluminum to thereby form a mirror 24, and sealed between the rock salt disc 16 and the disc 17, with the side having the mirror 24 juxtaposed to the glass disc 17. After or during the sealing process, a small difference in atmospheric pressure is created in the chambers 22 and 23, the predominate pressure being in the chamber 23 in order to make the mirror 24 concave toward the disc 17. This difference in pressure is obtained by providing a vent through the disc 17, so that the chamber 23 is open to atmospheric pressure by which the set position of the mirror 24 is fixed. Further, this vent allows free sensitive deforming of the mirror unhampered by back pressure, which would occur if the chamber 23 were sealed. In this way a very accurate spherical mirror is constructed having the desired rather long focal length. This mirror 24 is also characterized by the fact that it has negligible mass, and at the same time, a very high thermal coefficient of expansion. By reason of the dye impregnated in this membranous mirror, the maximum possible amount of heat energy will be absorbed.

For visibly producing an image of the heat image focussed upon the responsive unit 14, a screen 25 is located having an aperture 26, somewhat off the optical axis of the mirror 24 and spaced from the mirror a distance equal to its radius of curvature. This aperture 26 is arranged to be illuminated by a source of light, such as the lamp 27. On the opposite side of the optical axis from the aperture 26 a suitable eye piece is located containing a knife edge 28 across which the mirror 24 can be viewed. If the surface of the mirror 24 is exactly spherical, it will appear to be uniformly illuminated. This method of examining a spherical reflecting surface is known as the "Focault test," and such a test reveals extremely minute deviations from a truly spherical surface, the indications being in the form of light or dark spots on the surface, depending upon whether the radius of curvature of that incremental area is greater or less than the normal focal length of the mirror 24.

From the foregoing, it will be apparent that a heat image of the area under observation is formed on the diaphragm 21, and in consequence of its high thermal coefficient, very small changes in temperature will effect considerable imperfections in the mirror surface. The amplitude of these imperfections will depend upon the amount of heat impinging upon each incremental area of the diaphragm 24. Thus, the formation of a heat image on one side of the diaphragm results directly in mirror deformations which may be viewed by the optical system including the aperture 25, the lamp 26, and the knife edge 28.

Having thus described my invention, I claim:

1. In a heat detecting system, the combination of a heat responsive unit comprising a sealed housing, a heat wave receiving window in one side of said housing, a second window formed of light-transmitting material in the opposite side of said housing, a membranous diaphragm mounted between said windows and spaced therefrom to form two chambers, said diaphragm being deformable by heat waves from said receiving window, means creating a differential pressure in said chambers to maintain said diaphragm initially concave towards said second window, a mirror attached to the concave side of said diaphragm and having a matching contour, and an optical system including a source of light for viewing rays of light reflected from said mirror to determine incremental deformations of said diaphragm whereby an approximate image of the source of heat waves is observable.

2. In a heat detecting system, the combination of a heat-responsive unit comprising a sealed housing, a heat wave receiving window in one side of said housing, a second window formed of light-transmitting material in the opposite side of said housing, a membranous diaphragm mounted between said windows and spaced therefrom to form two chambers, said diaphragm being deformable by heat waves from said receiving window, means creating a differential pressure in said chambers to maintain said diaphragm initially concave towards said second window, a mirror attached to the concave side of said diaphragm and having a matching contour, a source of light, and means including an optical system for continuously viewing changes of light reflected from said mirror due to deformations of said diaphragm in response to the varying intensity of incident heat waves whereby an approximate image of the source of heat waves is observable.

3. In a heat detecting system, the combination of a heat-responsive unit comprising a sealed housing, a heat wave receiving window in one side of said housing, a second window formed of light-transmitting material in the opposite side of said housing, a membranous diaphragm mounted between said windows and spaced therefrom, said diaphragm being initially concave toward said second window and deformable by heat waves from said receiving window, a concave mirror formed by depositing a reflecting material on the concave side of said diaphragm, and a source of light, and means including an optical system for continuously viewing changes of light reflected from said mirror due to deformations of said diaphragm in response to the varying intensity of incident heat waves whereby an approximate image of the source of heat waves is observable.

4. In a heat detecting system, the combination of a heat-responsive unit comprising a sealed housing, a heat wave receiving window in one side of said housing, a second window formed of light-transmitting material in the opposite side of said housing, a membranous diaphragm mounted between said windows and spaced therefrom, said diaphragm being initially concave toward said second window and deformable by heat waves from said receiving window, a concave mirror formed by depositing a reflecting material on the concave side of said diaphragm, and a screen positioned from said mirror a distance equal to the radius of curvature of said mirror and having an aperture to one side of its optical axis, a source of light to project rays of light through said aperture upon said mirror, and means spaced a distance equal to the radius of curvature of said mirror, and an equal distance on the opposite side of said optical axis from said aperture for continuously viewing changes of light reflected from said mirror due to deformations of said diaphragm in response to the varying intensities of incident heat waves whereby an approximate image of the source of heat waves is observable.

5. In a heat detecting system, the combination of a heat-responsive unit comprising a sealed housing, a heat wave receiving window in one side of said housing, a second window formed of light-transmitting material in the opposite side of said housing, a membranous diaphragm mounted between said windows and spaced therefrom to form two chambers, said diaphragm having a large thermal expansion coefficient and being coated on one side to form a mirror juxtaposed to said second window, means creating a differential pressure in said chambers to maintain said diaphragm initially concave towards said second window, and a source of light, and means including an optical system for viewing changes of light reflected from said mirror due to deformations of said diaphragm in response to the varying intensity of incident heat waves whereby an approximate image of the source of heat waves is observable.

6. In a heat detecting system, the combination of a unit including a membranous diaphragm responsive to radiant heat waves from a source of heat, a mirror forming one face of said diaphragm, and a light-transmitting window opposite to said mirror, a source of light at one side of the optical axis of said mirror and in front of said mirror, an apertured screen for projecting said light upon said mirror, and a knife edge on the opposite side of the optical axis of said mirror from said light source for viewing said mirror, whereby an approximate image of the source of heat waves is observable.

7. In a heat detecting system, the combination of a unit responsive to radiant heat waves from a source of heat, including a membranous diaphragm, a mirror forming one face of said diaphragm, a disc of rock salt spaced from the opposite face of said diaphragm, and a light-transmitting window opposite said mirror, said unit forming chambers on opposite side of said diaphragm, means creating a differential pressure in said chambers to cause said diaphragm to form said mirror to assume a concave contour opposite to said window, a source of light at one side of the optical axis of said mirror and in front of said mirror, an apertured screen for projecting said light upon said mirror and a knife edge on the opposite side of the optical axis of said mirror from said light source for viewing said mirror, whereby an approximate image of the source of heat waves is observable.

WILLIAM A. TOLSON.

REFERENCES CITED

The following references are of record in the file of this patent:

UNITED STATES PATENTS

| Number | Name | Date |
| --- | --- | --- |
| 2,231,170 | Lindenblad | Feb. 11, 1941 |
| 504,890 | Ohmart | Sept. 12, 1893 |
| 1,550,381 | Massolle | Aug. 18, 1925 |
| 1,930,518 | High | Oct. 17, 1933 |
| 2,278,936 | Lindsay | Apr. 7, 1942 |